United States Patent
Manani et al.

(10) Patent No.: US 9,100,365 B2
(45) Date of Patent: Aug. 4, 2015

(54) WEB APPLICATION PROCESS

(75) Inventors: Rajen Manani, Beckenham (GB);
Simon Howe, Bridgend (GB)

(73) Assignee: British Telecommunications PLC, London (GB)

( * ) Notice: Subject to any disclaimer, the term of this patent is extended or adjusted under 35 U.S.C. 154(b) by 188 days.

(21) Appl. No.: 13/256,685

(22) PCT Filed: Mar. 9, 2010

(86) PCT No.: PCT/GB2010/000417
§ 371 (c)(1),
(2), (4) Date: Sep. 15, 2011

(87) PCT Pub. No.: WO2010/106303
PCT Pub. Date: Sep. 23, 2010

(65) Prior Publication Data
US 2012/0005738 A1      Jan. 5, 2012

(30) Foreign Application Priority Data

Mar. 17, 2009    (GB) .................................. 0904559.2

(51) Int. Cl.
*H04L 9/32*      (2006.01)
*H04L 29/06*     (2006.01)

(52) U.S. Cl.
CPC ........ *H04L 63/0209* (2013.01); *H04L 63/0281* (2013.01); *H04L 63/0815* (2013.01)

(58) Field of Classification Search
USPC ...................................................... 726/1, 26
See application file for complete search history.

(56) References Cited

U.S. PATENT DOCUMENTS

| 5,642,410 | A   | 6/1997  | Walsh et al. |
| 7,136,475 | B1  | 11/2006 | Rogers et al. |
| 7,231,661 | B1* | 6/2007  | Villavicencio et al. ........... 726/4 |
| 2004/0117493 | A1 | 6/2004 | Bazot et al. |

(Continued)

FOREIGN PATENT DOCUMENTS

| GB | 2 394 141 | 4/2004 |
| WO | 97/13352  | 4/1997 |
| WO | 00/59189  | 10/2000 |

(Continued)

OTHER PUBLICATIONS

Peter Sommerlad: "Reverse Proxy Patterns" EuroPLoP Papers 2003, XP002591797 Retrieved from the Internet: URL:http://hillside.net/europlop/HillsideEurope/Papers/EuroPLoP2OO3/2OO3_Sommerlad_ReverseProxyPatterns.pdf [retrieved on Jul. 13, 2010].*
International Search Report for PCT/GB2010/000417, mailed Aug. 3, 2010.

(Continued)

*Primary Examiner* — Gilberto Barron, Jr.
*Assistant Examiner* — Devin Almeida
(74) *Attorney, Agent, or Firm* — Nixon & Vanderhye PC

(57) ABSTRACT

A computer network and corresponding method for providing, as part of a web portal session, access for a user to a web application running on a server. The network includes first and second traffic managers connected via an intermediate web server. The first traffic manager includes an interface for receiving from the user, as part of the portal session, a request for access to the web application and for passing the request to the intermediate web server; and for forwarding to the second traffic manager. The second traffic manager includes an interface for receiving the request from the first traffic manager via the intermediate web server and for passing the received request to the web application.

18 Claims, 9 Drawing Sheets

(56) References Cited

U.S. PATENT DOCUMENTS

2007/0283421 A1    12/2007    Hirose
2008/0118046 A1    5/2008    Katkam et al.

FOREIGN PATENT DOCUMENTS

WO            02/45399       6/2002
WO    WO 2008/036947       3/2008

OTHER PUBLICATIONS

Search Report (1 pg.) dated Jun. 25, 2009 issued in GB Application No. GB0905270.5.

International Search Report (4 pgs.) dated May 27, 2010 issued in International Application No. PCT/GB2010/000418.

Ecma International, Standard ECMA-269, 7$^{th}$ Edition, Dec. 2006 "Services for Computer Supported Telecommunications Applications (CSTA) Phase III", 767 pgs.

* cited by examiner

Log in:

User name:

Password:

[ log in ▸ ]

Forgotten your password?
Forgotten your username?

Helpdesk:
Telephone: +44 (0)
Email: gsphelp

Figure 8

WEB APPLICATION PROCESS

This application is the U.S. national phase of International Application No. PCT/GB2010/000417 filed 9 Mar. 2010 which designated the U.S. and claims priority to GB Patent Application No. 0904559.2 filed 17 Mar. 2009, the entire contents of each of which are hereby incorporated by reference.

TECHNICAL FIELD

Certain exemplary embodiments are directed to the field of web applications in general and access to web applications.

BACKGROUND AND SUMMARY

Certain exemplary embodiments address the problem in a dual web-site operation, for example, where access to a web application (which may or may not be provided by a second party) is made available for service delivery to a user through a service provider web portal (which may or may not be provided by a third party), for example, where the web portal enables single sign-on (SSO).

FIG. 1 shows a conventional communications network for providing user 10 access, via browser 12 and internet 14, to an application (e.g. App1, App2, App3) on back-end servers (BES) 28. Browser 12 connects via internet 14 to network switch 16, for example a Cisco ACE which provides standard functions such as load balancing and address translation. Network switch 16 is in communication with web server 40, for example a SunOne server hosting SiteMinder single sign-on web agent for a web portal. Web server 40 is connected to policy server 42 and application server 50 hosting a web portal.

In order to be able to use conventional single sign-on to access an application running on back-end servers (BES) 28, user 10 first has to be authenticated by signing-on to web portal 50 via web server 40. To allow access to an application e.g., App1 running on BES 28, following a successful sign-on, portal web server 40 displays on browser 12 a list of applications accessible by the authenticated signed-on user. Only those applications which the user is authorized to access are displayed to the user on browser 12 by the web portal on application server 50, through web server 40. A domain name server (DNS), not shown, is included in internet 14. With the single sign-on system of FIG. 1, all applications (e.g. App1, App2, App3) running on BES 28 share a single domain name server (DNS) record (e.g.: sso.<Portal DNS>). When the user, signed-on with the web portal via server 40, selects a prompt displayed on the web page displayed in browser 12 for one of the applications running on BES 28, browser 12 opens a new window and generates a request, including a URL associated in the DNS with a public IP address of portal web server 40. On receiving the request, the single sign-on web agent on portal web server 40 authenticates user 10 and, following successful authentication, portal web server 40 forwards the request to single sign-on proxy 18. Single sign-on proxy 18 is responsible, with reference to portal database 32, for authorizing requests from user 10 for access to the applications on BES 28 and is responsible for proxying user requests to BES 28.

The specific application on BES 28 that is the subject of the request is determined from the context path (comprised in the request URL). Requesting user 10 is identified from a HTTP header "SM_USER", which is injected in the request by the single sign-on web agent on web server 40. Any other information necessary for user authorization is either supplied in the request or is obtained from portal database 32 and the user's authorization to access the requested application is validated accordingly.

If the single sign-on web agent on web server 40 authenticates—and single sign-on proxy 18 authorizes—the user to access the requested application, the user request is proxied by single sign-on proxy 18 to BES 28 in conventional manner using the Apache httpclient library. For access to applications via single sign-on, proxy 18 is responsible for sending to BES 28, in a HTTP header, any information required for authentication and authorization of requesting user 10. The response from BES 28 to the user request is processed by the single sign-on web agent on proxy web server 40 to remove any references identifying an application on BES 28, such as IP address, DNS entry and port number—so that any further requests from browser 12, to access a resource on BES 28 are addressed to single sign-on web agent on web server 40, rather than directly to BES 28. Having been suitably processed on single sign-on proxy 18, the response from BES 28 follows the return path to browser 12 via web server 40.

The conventional access system of FIG. 1 has a number of disadvantages. The performance is limited due to the inefficient authorization and communication with the back end system. The logic to authorize the request is quite complex, as identifying the application from the context in the request is complicated, requiring a lot of bespoke coding to handle the request and response when it passes through single sign-on proxy 18.

Simultaneous requests require additional threads to be created on single sign-on proxy 18. Therefore, the number of users is limited by the number of simultaneous threads the single sign-on proxy 18 can handle. The number of threads has a practical limit, as allowing a high number of threads can cause an adverse impact on the performance of the SSO proxy application server 18. The conventional access system does not support desirable features such as load balancing, support for fail-over and connection monitoring.

Certain exemplary embodiments improve upon known methods and computer networks for providing access to web applications as part of a web portal session. This is achieved, according to a first aspect, through a computer network, comprising: first and second traffic managers connected via an intermediate web server. The first traffic manager comprises interface means for receiving from the user, as part of the portal session, a request for access to the web application and for passing the request to the intermediate web server; for forwarding to the second traffic manager. The second traffic manager comprises interface means for receiving the request from the first traffic manager via the intermediate web server and for passing the received request to the web application.

The computer network advantageously achieves efficient portal session validation together with distribution of the workload between the components (i.e.: the two traffic managers and intermediate web server).

According to a second aspect, there is provided a method of validating a user as part of a web portal session. The method includes receiving from a web browser a request for access to the web application; in which the request comprises a web portal session cookie. The method includes detecting, at a first traffic manager, the web portal session cookie provided in the request and; when a web portal session cookie has been detected, checking the request for a cookie generated by the first traffic manager indicating authorization of the user to access the application. When the cookie generated by the first traffic manager is found in the request, forwarding the request via an intermediate web server to a second traffic manager; which forwards the request to the application.

According to a further aspect, on detecting a first request, the first traffic manager forwards the request to the intermediate web server for authentication and authorization, to ensure the session is valid. In order to avoid having to re-validate the session again on subsequent requests, the first traffic manager inserts special cookies in the response to the first request. These special cookies are repeated in subsequent requests issued by the same user for access to the same application in the same portal session. The presence of these special cookies in subsequent requests allows the first traffic manger to omit further validation steps.

According to a further aspect, the second traffic manager forwards the request to the application along with information provided from a database via the intermediate web server identifying the application.

According to a further aspect, the first traffic manager does not need to do any processing to ensure a session is kept alive; as this function is handled by the intermediate web server. On receipt of a request from the first network traffic manager, the intermediate web server validates the portal session and keeps the portal session alive before forwarding the request.

According to a further aspect, one or more cookies generated by the application are name-spaced in which each name space corresponds to a different virtual server running on the first traffic manager. This name-spacing facilitates avoiding a clash between the names of cookies set by the back-end servers and those set by the web portal or the traffic managers.

An aspect of certain exemplary embodiments relates to a computer readable medium (e.g., a non-transitory computer readable storage medium) storing processor executable instructions for causing the methods described herein to be carried out when run on a general purpose computer.

BRIEF DESCRIPTION OF THE DRAWINGS

To aid understanding of the invention, embodiments will now be described by way of example only, with reference to the accompanying drawings in which:

FIG. 8 shows a screen shot of a sign-on page displayed on the user's browser.

DETAILED DESCRIPTION

Embodiments of the invention will now be described with reference to FIGS. 2 to 8.

Figure 1:
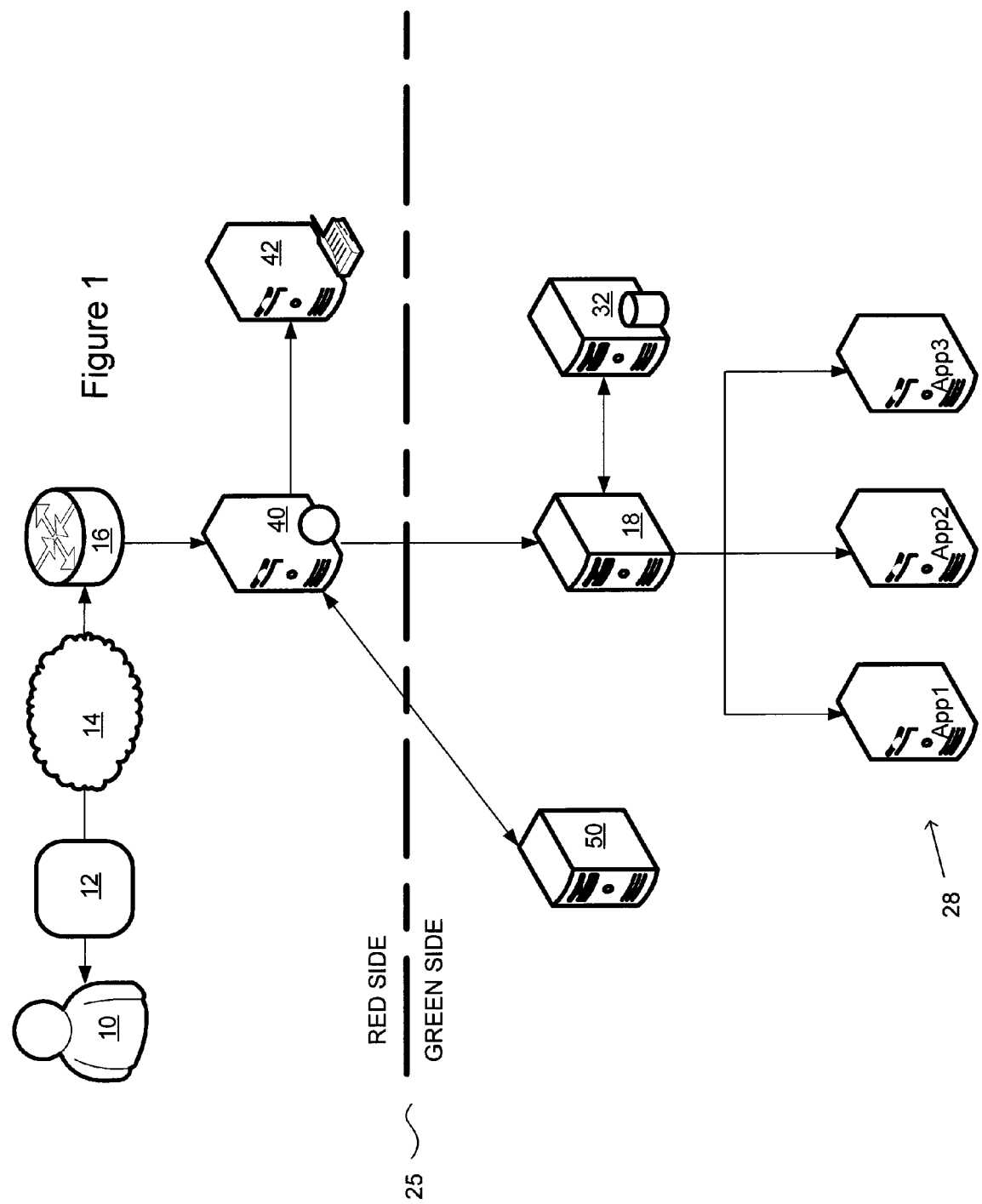
FIG. 1 shows a schematic of a conventional web-based IT system.
Figure 2:
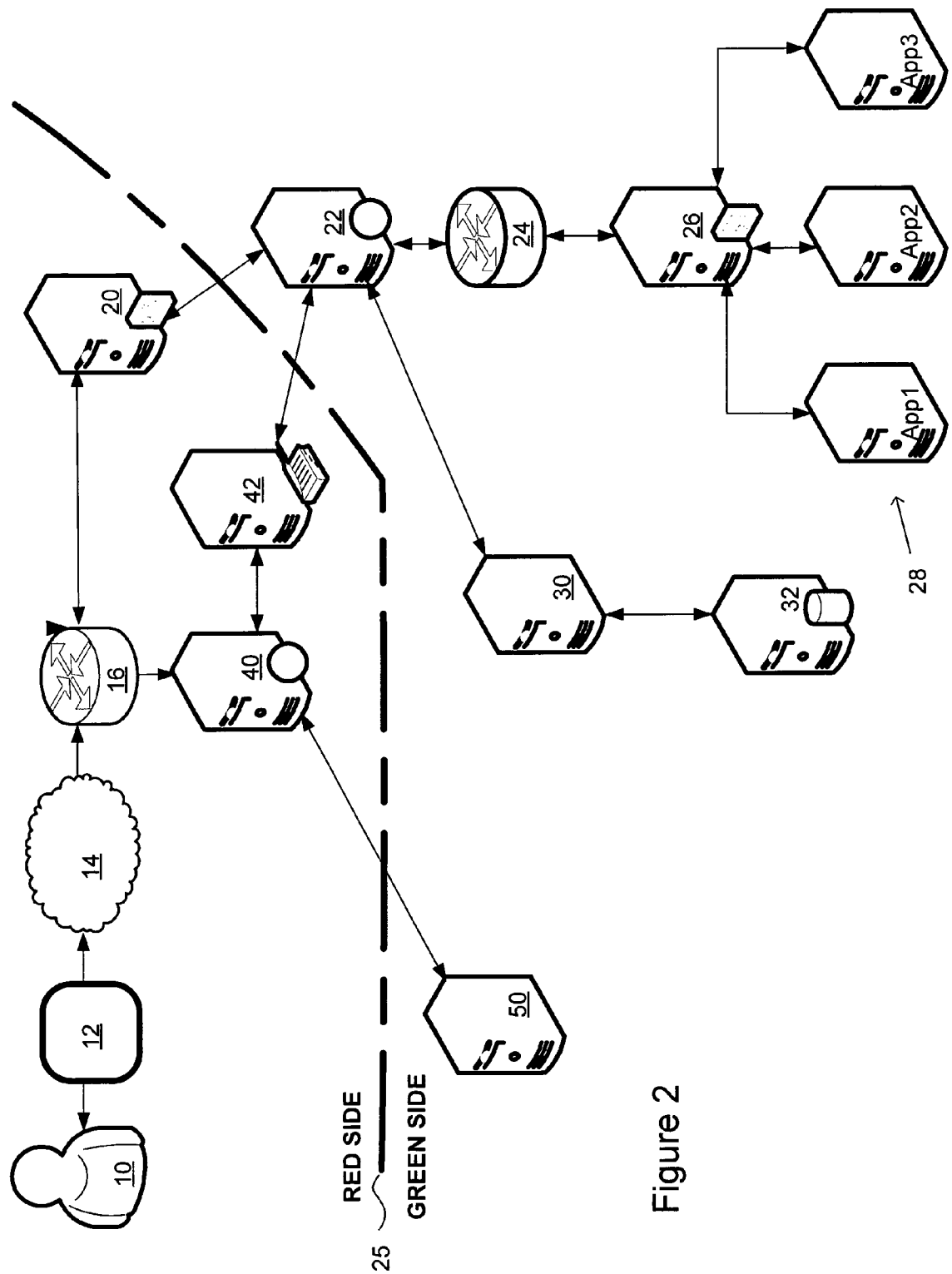
FIG. 2 shows a schematic of a web-based IT system according to an embodiment of the present invention.

FIG. 2 shows a web-based IT system (computer network) according to a first embodiment of the present invention. Features common to both FIGS. 1 and 2 are allocated the same reference numerals.

FIG. 2 shows a, user 10 accessing applications on back-end servers (BES) 28 via browser 12 and internet 14. Browser 12 connects via internet 14 to network switch 16, for example a Cisco ACE which provides standard functions such as load balancing and address translation. Network switch 16 is in communication with first traffic manager 20, for example an F5 BIG-IP or Zeus ZX™ network traffic manager, and web server 40, for example a SunOne server hosting SiteMinder single sign-on web agent for a web portal.

Firewall 25 divides so-called "red-side" elements, which are unverified and represent a potential security risk, from so-called "green-side" elements which exist in a controlled environment, such as an organisation's private internal network, and are considered as secure and not presenting a security risk. As shown in FIG. 2, according to a preferred embodiment, first traffic manager 20 occupies the so-called "red-side" of firewall 25 in common with other "red-side" elements 10, 12, 14, 16, 40 and 42. Elements 22, 24, 26, 30, 32, and 50 exist on the secure, so-called "green-side" of firewall 25. BES 28 may be embodied as a single server or multiple severs and, not being restricted as to geographical location, may be located on the red side or the green side of firewall 25.

First traffic manager 20 is in communication with "green-side" intermediate web server 22: a second server hosting single sign-on web agent, located on the "green-side" of firewall 25 intermediate between first traffic manager 20 and a second traffic manager 26. Both intermediate web server 22 and proxy web server 40 are in communication with policy server 42. Intermediate web server 22 is also in communication, according to an embodiment, with second network switch 24 on the "green-side", for example a Cisco ACE which provides conventional functions including load balancing. Network switch 24 is in communication with "green-side", second traffic manager 26, for example an F5 BIG-IP or a Zeus ZX™ network traffic manager. More information on the role of second network switch 24 is given later in respect of server clusters. Second traffic manager 26 is entrusted with proxying the applications (App1, App2, App3) on BES 28.

Policy server 42 holds details of security policies operated by portal web server 40 and intermediate web server 22. Authorization manager 30 and database 32 provide support for user authorization e.g. on the basis of the URL requested by the user, the application setup for that URL and user's profile setup in database 32 relevant to the requested application.

Figure 3A:
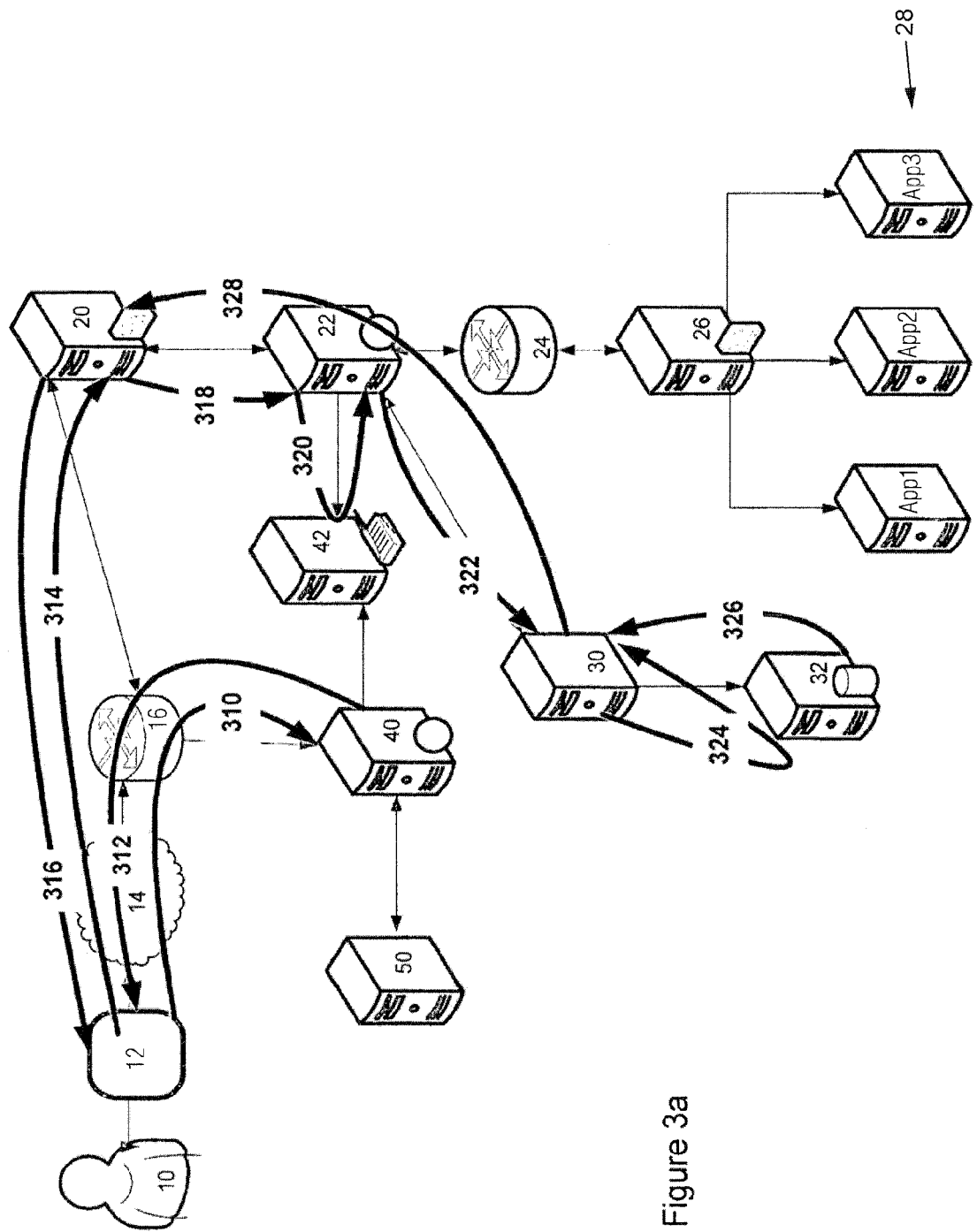
FIGS. 3a, 3b and 4 show the schematic of FIG. 2 with annotation to illustrate information flow according to embodiments of the present invention.
Figure 3B:
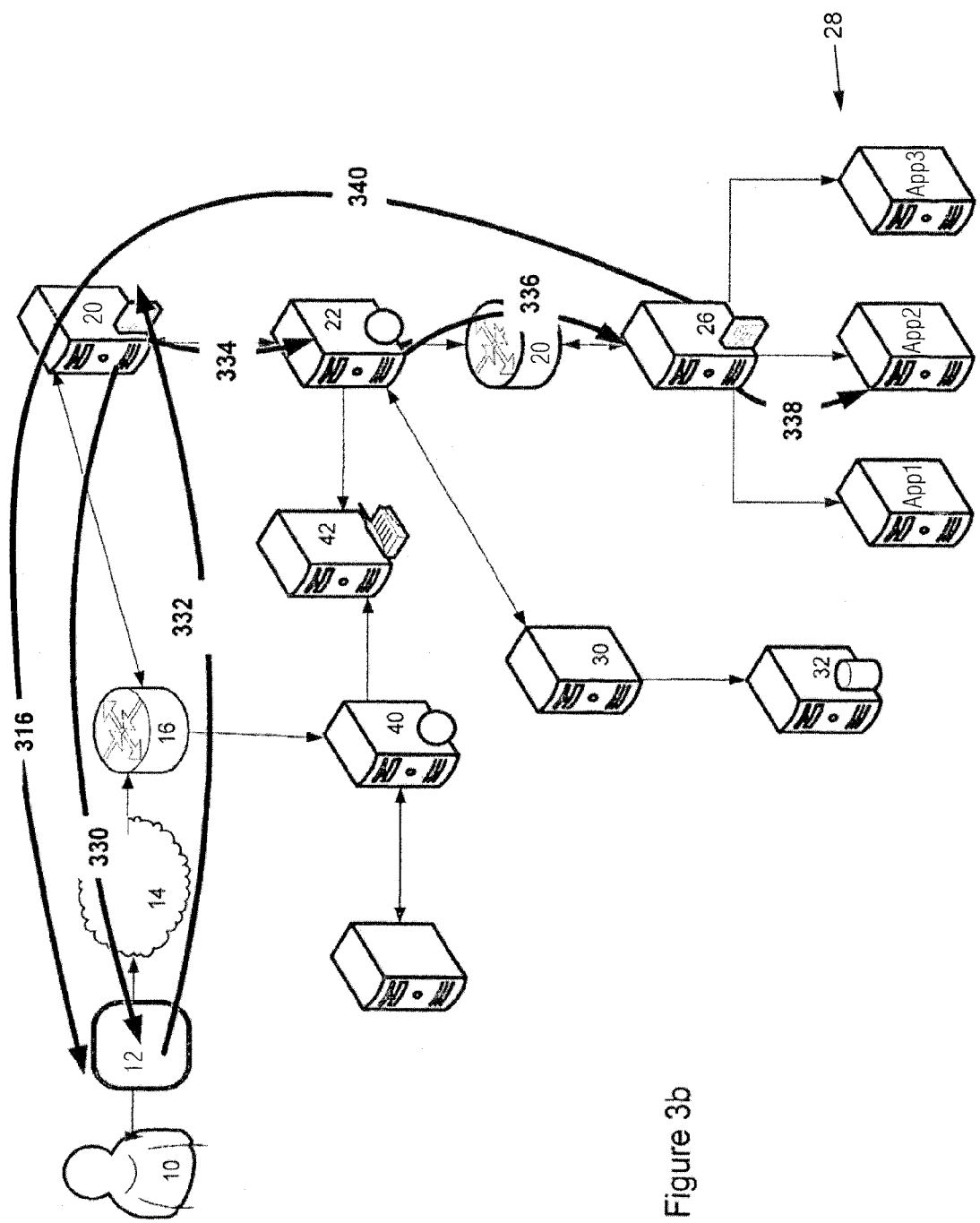

Operation of the network of FIG. 2 in handling a first request from a user for access to an application running on BES 28 will now be described with reference to FIGS. 2, 3a and 3b and 5. FIGS. 3a and 3b include arrows (310-340) to illustrate the various information flows described, below, in relation to the system of FIG. 2.

In operation, user 10 attempts to access, via browser 12 and internet 14, one of the applications (e.g.: application App1) running on BES 28. Initially, user 10 needs to sign-on with a web portal with which they have an account in order to set up a session and to obtain a corresponding web portal session cookie and username cookie. The user's portal sign-on request is directed by network switch 16 to portal web server 40 running single sign-on web agent which acts as a front-end for a web portal hosted on application server 50.

First Request

A first sign-on request is initiated by the user as follows. The user selects, in their browser 12, the address (i.e.: URL) of web server 40. The destination of this request will be determined in conventional manner by a domain name server (not shown) comprised in internet 14. The request is routed (see 310 in FIG. 3a), according to the selected URL from browser 12 via internet 14 and network switch 16 to portal web server 40. Portal web server 40 provides, via the reverse path (312), a sign-on page (as illustrated, for example, in FIG. 8) for display to the user by browser 12. The sign-on page is arranged to prompt the user for credentials (for example, username and password) to support the user's request to sign-on to the web portal. User 10 enters the requested information on the web page and, by selecting a prompt (for example "login") displayed on the web page, causes the data entered to be returned to portal web server 40, following the same path (310) as the original request. Single sign-on web agent running on portal web server 40 forwards the user identity information and user credentials to policy server 42 for verification. If policy server 42 finds that the user is correctly identified by the information provided, it informs portal web server 40 accordingly and portal web server 40 prompts application server 50 to provide, following the same path (312) as the original sign-on page, a further web page (the "portal home page") for presentation to the user.

According to a preferred embodiment the further web page, provided by application server 50 and presented on browser 12, provides the user with a username cookie, a web portal session cookie and a choice of web applications (e.g. applications App1, App2, App3 running on BES 28) that the user can access by selecting an appropriate service-delivery prompt on the web page. According to a preferred embodiment the further web page provides the user with a user's account identifier parameter (for example: "gbcAccountId") generated by web portal 50. By selecting an appropriate service-delivery prompt, the user causes browser 12 to generate a first request for service delivery from an application on BES 28. This request is routed (314) via internet 14 and network switch 16 to first traffic manager 20. As the user is already signed-on to the web portal, the first service delivery request (e.g. of the form "GET <URL>") will contain, in the HTTP header part of the URL, the username cookie and the web portal session cookie, generated as part of the web portal sign-on. A valid request also contains, as part of the URL, in the query string, the user's account identifier parameter generated by web portal 50.

Figure 5:
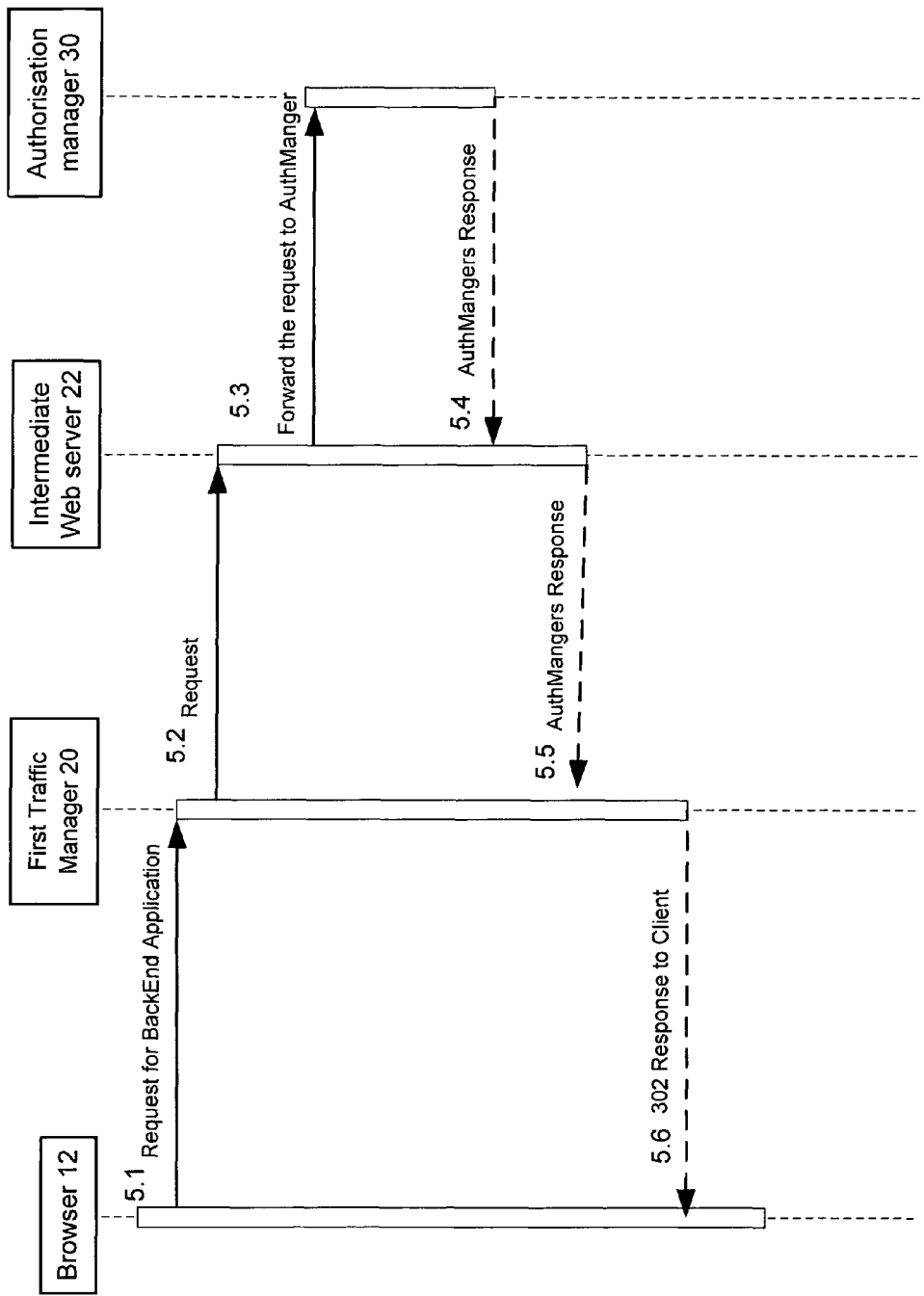
FIGS. 5 and 6 show schematic signal flows according to embodiments of the invention.

With reference to the sequence diagram in FIG. 5, the first service delivery request 5.1 is routed from browser 12 over Internet 14 via a secure link, typically using secure socket layer (SSL), which is terminated by first traffic manager 20.

First traffic manager 20 also holds digital certificates for presentation (316) to the user to provide the user with reassurance that they are in communication with a valid destination. First traffic manager 20 provides a rudimentary validation check, i.e.: checking that a web portal session cookie and a username cookie are present in the first service delivery request. The actual content of these cookies is not verified at this stage. If, however, first traffic manager 20 does not find appropriate cookies in the request, the user is prompted with a new sign-on page and the service delivery process is not pursued further, until the expected cookies are provided.

First traffic manager 20 then checks if a hashed variant of the username cookie (details provided later) is present in the request. If the hashed username cookie is not found, then first traffic manager 20 sets a flag in the request indicating that the hashed username cookie is to be created in first traffic manager 20, as described, below. The flag is of the form: connection.data.set("createUsernameHash", "true");

First traffic manager 20 also checks whether the current request is a subsequent (i.e.: not first) service delivery request for the web application. First traffic manager 20 checks if an application SSO data cookie (details provided later) of the requested application is present in the request. The application SSO data cookie will not be present if the request is in a first service delivery request for the web application made by the user since signing on to the web portal.

If the application SSO data cookie is not present but the username cookie, web portal session cookie and user's account identifier parameter are found in the request URL query string, then traffic manager 20 treats the current request as a valid first service delivery request for the particular web application. If the request is found to be a valid first request; first traffic manager 20 injects the string "/authm" in the service delivery request URL. First traffic manager 20 then forwards (318) the first service delivery request (including the username cookie, web portal session cookie and user's account identifier parameter) to intermediate web server 22 for further validation and authorization and for retrieval of parameters required by the requested web application (e.g. headers incorporating details of the user, user credentials for BES 28, etc)—see 5.2 in FIG. 5.

Intermediate web server 22 is also connected to policy server 42 and authorization manager 30. Hence the single sign-on web agent of intermediate web server 22 is able to identify invalid user requests for protected resources. Intermediate web server 22 validates the web portal session cookie comprised in the request received from first traffic manager 20 by referring (320) the cookie to policy server 42 (i.e. the same policy server as used by portal web server 40, as described above). Policy server 42 verifies whether the web portal session cookie is valid and the session has not timed out. Policy server 42 also renews the session, as appropriate, to avoid it timing out too soon.

Intermediate web server 22 receives from policy server 42 the result of the session cookie validation and, if positive, reacts to the inclusion of "/authm" in the request by first traffic manager 20 (denoting a valid first request) by forwarding (322) the service delivery request to authorization manager 30—see 5.3 in FIG. 5. The single sign-on web agent on intermediate web server 22, sets a parameter (for example "SM_USER") in the request header sent to authorization manager 30.

The request forwarded to authorization manager 30 contains the user's account identifier parameter in the URL query string. The username cookie, the web portal session cookie and "SM_USER" parameter values are contained in the standard HTTP header. The form of URL provided to authorization manager 30 relating to a first request is as follows: http://<appHostName[port]/authM/<remainingURLPath>?gbcAccountId=-<AccountId>[&gbcLoginname=<impersonated login name>]

An example of a URL provided to authorization manager 30 relating to a first request is as follows:
http://subdom.sso.internet.domain.com:7001/authM/abc/home?gbcAccountId=250031

Authorization manager 30 checks whether the user is authorized to access the requested application. In doing so, authorization manager 30 consults (324) portal database 32 which stores mappings for the requested domain name (e.g., subdom.sso.internet.domain.bt.com) and the application.

In more detail, authorization manager 30 extracts the user's sign-on name from the username cookie included in the service delivery request and compares it with the "SM_USER" parameter. The user's account identifier parameter from the query string of the request is used to identify the user's account (e.g., the user's company) and (so as to identify the requested application), the URL of the request is used to identify the domain name of the application. Authorization manager 30 then validates (324) the user for this application by checking against portal database 32, whether the user has authorization to access the requested application.

In the case of a positive result, authorization manager 30 collects (326) from domain database 32, the requested application's name, DNS/IP address, port, etc. along with additional parameters required by the requested web application, including relevant headers and directives. Authorization manager 30 then responds (328) to first traffic manager 20 with a "200" response code. According to one embodiment, a string response is generated by authorization manager 30, as it is easier for first traffic manager 20 to parse. The following are some of the possible alternative responses that could be sent by authorization manager 30 (all sent with HTTP response codes 200):

1. If the requested application's details are not found in the GS Database, then the authorization manager 30 will respond to traffic manager 20 with following parameters in the body of the response:
Redirect: NO;
ResponseStatus: 404 (Not Found);
ResponseMessage: Requested Application is not available.

2. If user is not authorized to view the application then authorization manager 30 will respond to traffic manager 20 with following parameters in the body of the response.
Redirect: NO;
ResponseStatus: 403 (Forbidden);
ResponseMessage: User is not provisioned for the application.

3. If user is an identified as authorized user for the web application then authorization manager 30 will respond to traffic manager 20 with following parameters in the body of the response:
Redirect: YES;
ResponseStatus: 302 (Found);
ResponseMessage: User is provisioned for the application;
<HeaderName>: <Header Value> (depends on what is required by SSO application);
ApplicationName: <ApplicationName>;
HostDetails: <ApplicationsHostDetails>.

Authorization manager 30 sends (328) the response to first traffic manager 20 via intermediate web server 22—see 5.4 and 5.5 in FIG. 5. In the response, authorization manager 30 includes the additional parameters required by the requested web application and retrieved from portal database 32. First traffic manager 20 incorporates these additional parameters into a new cookie: application SSO data cookie and sends (330 in FIG. 3b) the new cookie in a response to browser 12—see 5.6 in FIG. 5.

In more detail, the application SSO data cookie comprises the name of the application—which is treated by second traffic manager 26, as described later, as the pool name for the requested application on BES 28 (e.g., App1)—the DNS/IP address, port, etc of the requested application and any other information required by the application (such as headers incorporating details of the user, details of the applications running on BES 28, application credentials, user credentials, authentication scheme, etc). The application SSO data cookie contents are encrypted using the domain name used in requesting access to the application from browser 12, the username value from the username cookie and a secret key held on first and second traffic managers 20 and 26. Following encryption, the resulting cookie is hex-encoded before the cookie is set in the response (330) to browser 12.

As this is a response to the first request for the web application made by the user since signing on to the web portal, first traffic manager 20 detects, in the response (328) received from authorization manager 30, the flag it set earlier indicating that the hashed username cookie is to be created. First traffic manager 20 responds to the presence of the flag by generating and including in the response (330) a hash of the username cookie. (e.g.: SSO_USERNAME_HASH) and by removing the user's account identifier from the response. In more detail, the hash of the username cookie comprises an encrypted, hashed and hex-encoded value of the username set in the connection earlier.

The response sent to browser 12 carries response code "302", indicating that the browser should resubmit the request. The receipt of the "302" response causes browser 12 to automatically re-submit the request (332), without requiring any action by user 10. The re-submitted request includes, in addition to the web portal session cookie and username cookie (from the original request), the new hashed username cookie and application SSO data cookie generated by first traffic manager 20 specific to the requested web application. As the user's account identifier was removed by first traffic manager 20 from the response to the original request, the user's account identifier string is absent from the re-submitted request.

On receipt of the re-submitted request, first traffic manager 20 identifies the presence of the application SSO data cookie. First traffic manager 20 again forwards the request (334) to intermediate web server 22 but, as this time the user's account identifier is absent from the request URL, does not inject "/authm" in the request URL. Absence of /authm in the request URL results in intermediate web server 22 forwarding the request (336) to second traffic manager 26 via second network switch 24, rather than diverting to policy server 42 and authorization manager 30. According to a further embodiment, the request may still be diverted to policy sever 42 as an extra precaution, either each time a subsequent request is received or just occasionally.

Second traffic manager 26 checks the cookies associated with the received request (these cookies are: the web portal session cookie, username cookie, hashed username cookie and application SSO data cookie) and, if valid, forwards the request (338) to the requested web application running on BES 28 along with the headers required by the requested web application (these headers are those provided by authorization manager 30 from domain database 32 that were stored in application SSO data cookie by the first traffic manager 20).

In more detail, second traffic manager 26 decrypts the application SSO data cookie using the same elements (domain name used to access the application, username and the secret key) that are used by first traffic manager to encrypt the cookie. The application name available in this cookie is used by the second traffic manager to select an appropriate pool name and forward the request to the requested application. For example, if the application name is "ServiceEvents", the traffic manager selects the pool by the name "PL:GSP:ServiceEvents:Green". The traffic manager forwards the request using command: pool.use(<poolname>).

Response to First Request

Once the user has successfully signed-on to one of the web applications running on BES 28 (e.g.: application App1), second traffic manager 26 sends (340) the response received from the application to browser 12 via the reverse path through first traffic manager 20. The response may contain any additional cookies set by the requested application. These additional cookies are name-spaced using a unique string from the DNS (not shown) in Internet 14. If the user selects the same application (App1) again during the same web portal session, these name-spaced application cookies, provided through second traffic manager 26, are included in the subsequent request from the user.

Subsequent Request

Figure 4:
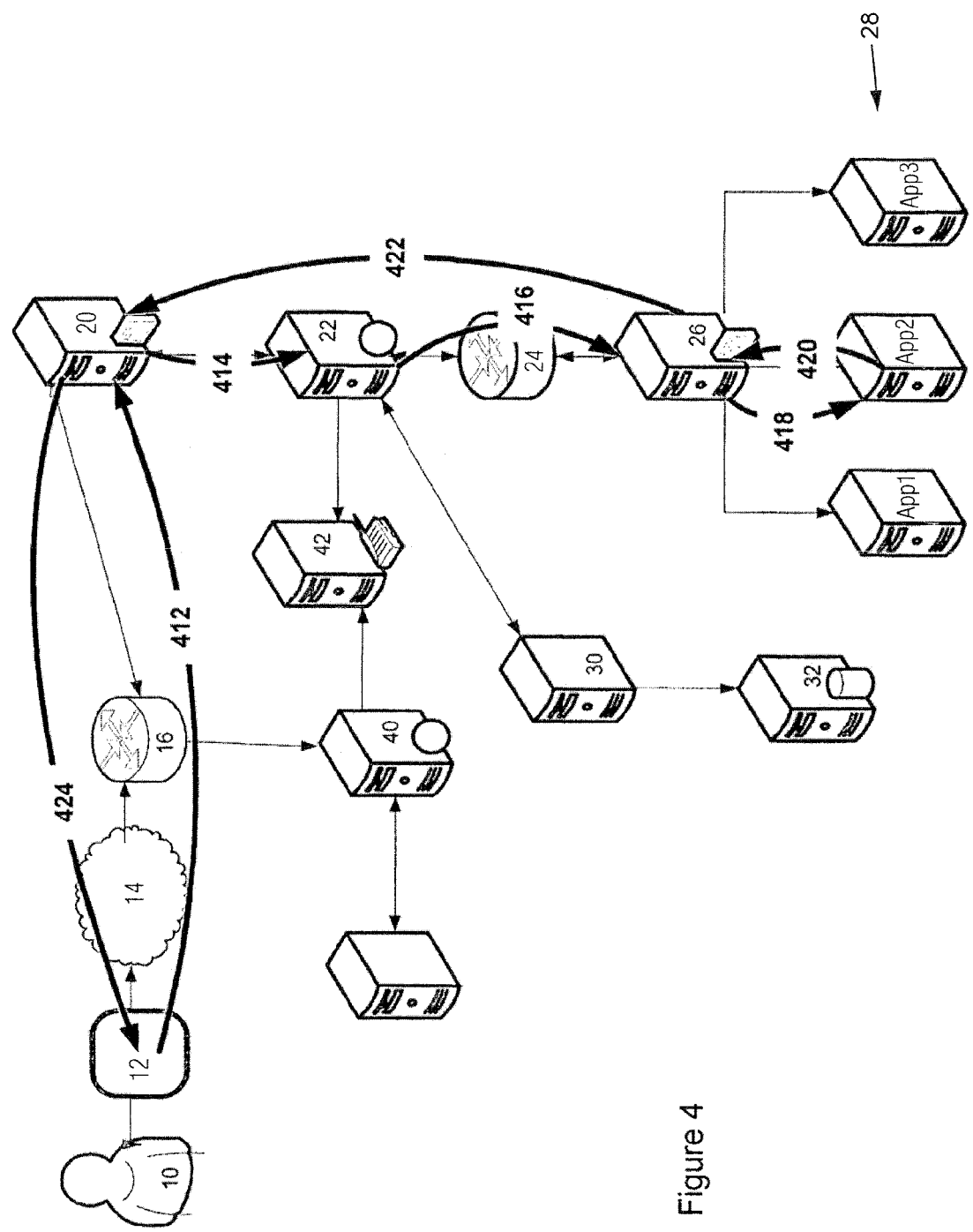
Figure 6:
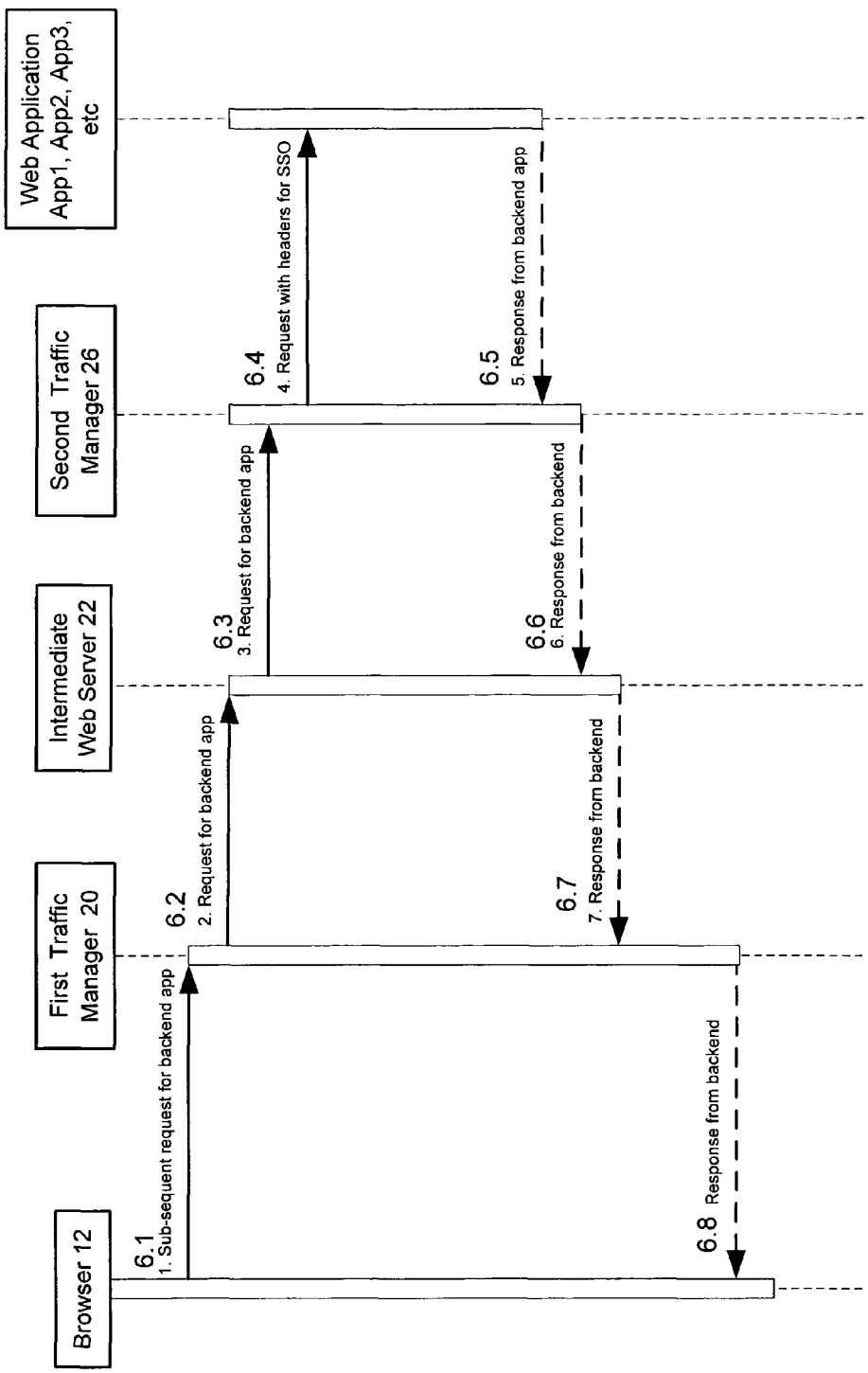

Operation of the network of FIG. 2 in handling a subsequent request from a user for access to the same application running on BES 28 will now be described with reference to FIGS. 2, 4 and 6. FIG. 4 includes arrows (412-424) to illustrate the various information flows described, below, in relation to FIG. 2. With reference to the sequence diagram in FIG. 6, the subsequent request 6.1 for an application running on BES 28 is routed from browser 12 over Internet 14 via a secure link, terminated by first traffic manager 20.

When user 10 submits a second or subsequent request (412) during the same web portal session, for access to the same application running on BES 28, browser 12 sends the request to first traffic manager 20, as before. Along with this request, browser 12 now sends any name-spaced application cookies provided by second traffic manager 26 along with the web portal session cookie and username cookie provided by web portal 50 and the hashed username cookie and application SSO data cookie created by first traffic manager 20 during the first response to the request for the web application, as described above.

First traffic manager 20 carries out a series of checks on the received request. Initial checks for the presence of the web portal session cookie, username cookie, hashed username cookie and application SSO data cookie are performed on every request. If all these cookies are found to be present, first traffic manager 20 then checks the validity of the application SSO data cookie by decrypting it using, as decryption key, a combination of the value of the username cookie, the DNS domain name used to access application and the a secret key (this is the reverse of the encryption process, described above). If the decryption of the application SSO data cookie is successful and if the user's account identifier is not present and the flag indicating that the hashed username cookie is to be created is not set in the header of the request, then first traffic manager 20 treats the current request as a valid subsequent request for web application 28 and forwards the request (414) to intermediate web server 22 (see FIG. 6, 6.2).

Intermediate web server 22 checks that the original portal session is still alive with reference to policy server 42. Policy server 42 renews the active session, as appropriate, to avoid premature termination.

As described, above, intermediate web server 22, has a single sign-on agent installed, which is connected to web portal policy server 42. Intermediate web server 22 is thus able to renew the user's web portal session, recorded on policy server 42 when it receives a request forming part of that session. In this way, it is possible to ensure that the session does not time out too soon. Since the request is a subsequent request, it does not have an indication that it is to be referred to authorization manager 30 (i.e.: absence of "/authm" in the URL), if intermediate web server 22 determines that the session is still active, it forwards the request (416) to second traffic manager 26 (see FIG. 6, 6.3), in accordance with web server configuration rules. In this case, the authentication and authorization steps described above for a first request, in which intermediate web server 22 consults policy server 42 and authorization manager 30, are omitted. These steps may safely be omitted in subsequent requests, as the encrypted application SSO data cookie serves to adequately identify the user's entitlement for the selected application.

On receiving the request, second traffic manager 26 parses the application SSO data cookie and uses the information within the cookie to proxy the request to the correct application running on BES 28 using the application name by using the appropriate pool as stated earlier. Second traffic manager 26 edits the appropriate headers, removes any cookies not relating to the application from the request apart from the web portal session cookie; removes the name-spacing (i.e.: the <APPNAME> part of the domain name of the incoming request) from the name of the application cookie and forwards the request (418) to the desired web application running on BES 28 (see FIG. 6, 6.4), using a pool identified (in the application name) using the application name in application SSO data cookie.

An example of the URL structure: of the subsequent request is as follows:

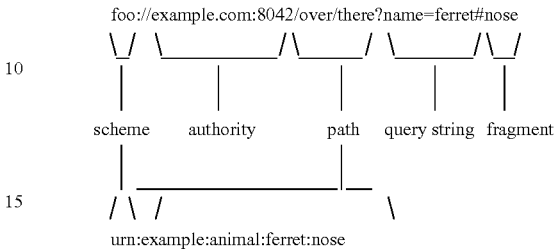

Response to Subsequent Request

The selected web application (App1, App2, . . . Appn) running on BES 28 processes the request and returns a response (420) to second traffic manager 26 (see FIG. 6, 6.5). The response of the selected web application follows the reverse path (422) to the request: from second traffic manager 26 via intermediate web server 22 (6.6) to first traffic manager 20 (6.7). First traffic manager 20 parses the response from the selected web application to remove the absolute paths/URL within the response that identify the actual domain and port details of the selected web application and replaces these with the web portal SSO domain and port details. For example, if for one application, the actual host name is:
subdomain.intranet.domain.com:8080;
and if the web portal SSO domain and port details for this application (used to access this application from browser 12 through internet 14) are given by:
subdom.sso.internet.domain.com:7001;
the following substitutions will be made in the response from the web application, i.e.: if the response contains:
<img src="http://subdomain.intranet.domain.com:8080/images/logo.gif">;
then it is changed by the response parsing rule of first traffic manager 20 to:
<img src="http://subdom.sso.internet.domain.com:7001/images/logo.gif">.

First traffic manager 20 also modifies the names of the cookies that are set by the selected web application running on BES 28 by name-spacing each such cookie, i.e.: prefixing each cookie with the application-name part of the web portal SSO domain name relating to the current request (e.g. "subdom"), as explained earlier. First traffic manager 20 also changes the domain of the cookies to the web portal SSO domain for web application 28, as described below:

Details of cookie being set by web application are:
Cookie Name: JSESSIONID
Cookie Value: <cookie value>
Path flag value: /
Domain flag value: subdomain.intranet.domain.com
   If the domain name & port of the incoming request is subdom.sso.internet.domain.com:7001,
then first traffic manager 20 will modify the above cookie as follows:
Cookie Name:subdom_JSESSIONID
Cookie Value: <cookie value unchanged>
Path flag value: /
Domain flag value: subdomain.sso intranet.domain.com
   After parsing the response, first traffic manager 20 sends (424) the modified response to browser 12 where it is treated as if it were received from the web application directly (see FIG. 6, 6.8). Hence, the SSO solution is invisible to browser 12.

Advantageously, use of the various cookies, as described above, has the effect of converting normally stateless second traffic manager 26 into a stateful machine.

Server Clusters

A problem arises with conventional reverse proxies where a web application running on BES 28 returns a link that points to a different context from the context of the original application. The problem arises when the web browser (on a subsequent request) generates a new request. The problem is that the conventional reverse proxy solution is unable to determine which application to send the request to. The context is used by prior solution to identify the requested back-end application. If two applications have same context (i.e.: the string following <protocol>://<DNS/IP>[:port]/), the conventional single sign-on solution fails to identify the requested back-end application.

In order to ensure that each of the web applications running on BES 28 is able to return to the appropriate user a link specific to that web application, each server in BES 28 is provided with a distinct DNS record. A mapping between the distinct DNS record for a BES 28 server and the details of an actual web application running on that BES server (including the web application's actual DNS/IP address and port) is stored in portal database 32, interrogated by authorization manager 30 at the time of receiving a first valid request.

To enable each application running on BES 28 to maintain its state for each user, each application running on BES 28 is assigned a unique domain name and a port number (e.g.: the standard ports 80 and 443). In order to provide each server of BES 28 with a distinct DNS record, first traffic manager 20 supports a plurality of virtual servers, a separate virtual server is configured on first traffic manager 20 for each application running on BES 28 and the unique domain name allocated to each virtual server running on first traffic manager 20 comprises the DNS record and port for one of the applications running on BES 28. Authorization manager 30 is then able to identify an application which is the subject of a request, using the unique domain name included with the request (i.e. the domain name corresponding to the desired application) when it is forwarded by intermediate web server 22.

For example: If incoming request looks like: http://subdom.sso.internet.domain.com:7001, then the domain name of request "subdom.sso.internet.domain.com" will tell authorization manager 30 that the request is for say a specific order management application running on BES 28. This mapping, as stated earlier, is stored in the portal database 32.

To ensure that subsequent requests from a user for the same web application running on BES 28 are received and processed by the same virtual server within first traffic manager 20, first traffic manager 20 is programmed to replace, within text responses from a web application running on BES 28, any occurrence of the application's actual domain name with the domain name and port number assigned to the application on the web portal 50, i.e. the web portal SSO domain and port details.

First traffic manager 20 and second traffic manager 26 may, according to a preferred embodiment, each comprise a cluster of two or more servers. The servers of a traffic manager cluster will preferably be operated in active-active mode. Each of first traffic manager 20 and second traffic manager 26 is connected via a network switch (16, 24, respectively) which distributes requests between the multiple servers in each cluster to balance the load. The clusters of servers enhance the processing ability and throughput of the traffic managers and are distinct from the virtual servers, described above, which may be hosted on either a single server or on a cluster of servers.

The computer network of certain exemplary embodiments provides a different session for each user, so the session ID can be used to identify the user and the requested application be decided from the context and information to be sent to BES 28 which stores the state.

Figure 7:
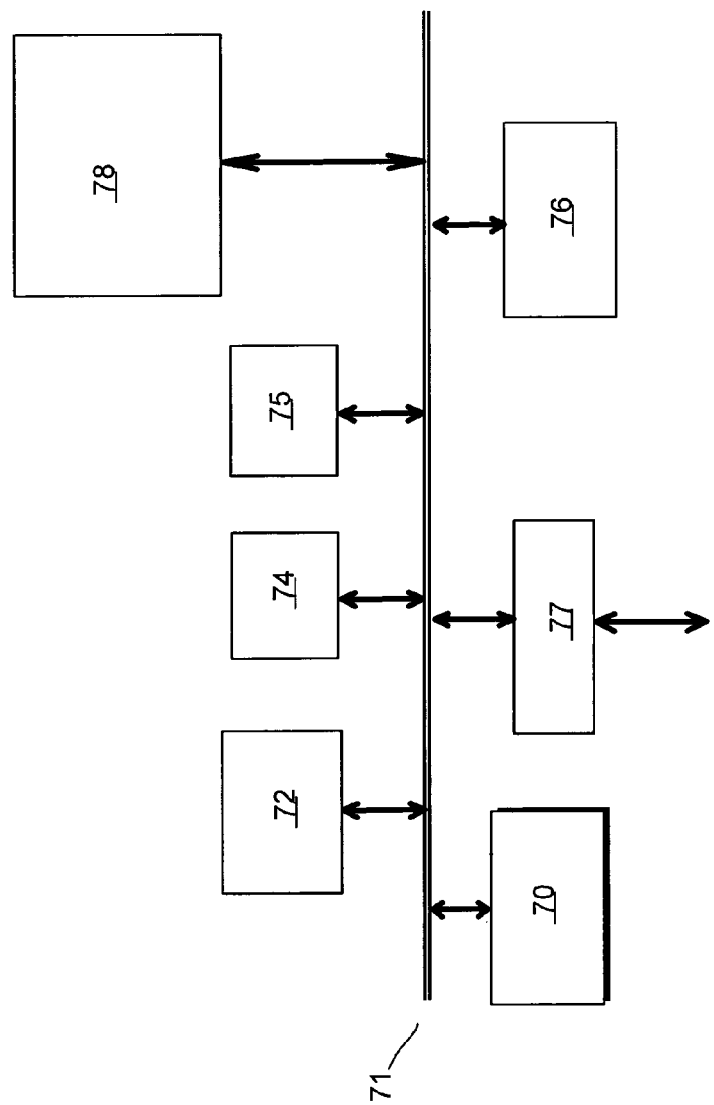
FIG. 7 shows a schematic of a server for implementing an embodiment of the invention.

As will be understood by those skilled in the art, first traffic manager 20, second traffic manager 26 and intermediate web server 22, described above may each be implemented as one or more commercially available server or similar general-purpose processing means, as illustrated in FIG. 7. FIG. 7 shows a typical architecture for a server suitable for implementing the network controller according to a further embodiment of the invention. In practice, a number of such servers will typically be required. The server comprises a central processing unit (CPU) 70 for executing software programs and managing and controlling the operation of the processing means. The CPU 70 is connected to a number of devices via a bus 71, the devices including a storage device 72, for example a hard disk drive for storing system and application software and memory devices including ROM 74 and RAM 75. The server further includes communications interfaces 77 for interfacing to external network components (for example other components within the web-based IT system (computer network) of FIG. 2)). The server can also include user input/output devices such as a mouse and keyboard (not shown) connected to the bus 71 via an input/output port 76, as well as a display 78. It will be understood by the skilled person that the above described architecture is not limiting, but is merely an example of typical server architecture. It will be further understood that the described server has all the necessary operating and application software to enable it to fulfill its purpose.

The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of another of the embodiments, or any combination of the embodiments. Furthermore, equivalents and modifications not described above may also be employed without departing from the scope of the invention, which is defined in the accompanying claims.

Although described above for reasons of clarity with a single application running on each server of BES 28, the application access system described above may be applied to situations in which a plurality of applications are running on one or more server of BES 28. Similarly, BES 28 is not limited to a single data centre or a single geographical location. Many aspects, described above are optional and still more are merely examples which may be implemented differently in alternative embodiments of the application access system described above. By way of example, the intermediate web server 22 may be arranged to not refer each subsequent request to policy server 42, for reasons of efficiency.

The arrangement of first traffic manager 20, second traffic manager 26 and intermediate web server 22 allows sharing of the workload. First traffic manager 20 acts as receiver of requests, working separately from the portal server, while second traffic manager 26 is responsible for proxying the requests. According to a preferred embodiment, first traffic manager 20 acts as a firewall with intermediate web server 22 located on the green side of the network and web server 40 located on the red side. First traffic manager 20 identifies individual requests and differentiates between a first request and any subsequent requests from a user for an application. On detecting a first request, the traffic manager checks session validity and forwards the request to a web server for authentication and authorization, to ensure the session is valid. In order to avoid having to re-validate the session on subsequent requests, the traffic manager inserts special cookies in the response to the first request. These special cookies are repeated in subsequent requests issued by the same user for access to the same application in the same portal session. The presence of these special cookies in subsequent requests allows the traffic manager to omit further validation steps. Application identification is done using the DNS that is used for accessing the application.

Advantageously, first traffic manager 20 does not need to do any processing to ensure a session is kept alive; as this function is handled by intermediate web server 22, through which all requests to the applications running on BES 28 and to authorization manager 30 are routed.

The invention claimed is:

1. A method of validating a user for access to a web application, the method comprising:
    receiving from a web browser a request for access to the web application; in which the request comprises a web portal session cookie;
    at a first traffic manager, detecting the web portal session cookie provided in the request;
    when a web portal session cookie has been detected, checking the request for a cookie generated by the first traffic manager indicating authorization of the user to access the application; and
    when the cookie generated by the first traffic manager is found in the request, forwarding the request via an intermediate web server to a second traffic manager; in which the second traffic manager forwards the request to the application,
    wherein the application responds to the request forwarded by the second traffic manager with a response including one or more cookies generated by the application, and
    wherein the one or more cookies generated by the application are name-spaced and each name space corresponds to a different virtual server running on the first traffic manager.

2. The method of claim 1, wherein:
    when no cookie generated by the first traffic manager indicating authorization of the user to access the application is found in the request, the first traffic manager forwards the request to the intermediate web server for validating and authorizing the user for access to the application;
    upon receiving a response from the intermediate web server indicating successful validation and authorization of the user, the first traffic manager generates a cookie indicating authorization of the user to access the application and sends the cookie to the web browser in a response to the request; and
    the response requires the web browser to resubmit the request incorporating the cookie sent in the response.

3. The method of claim 1, wherein the second traffic manager forwards the request to the application along with information identifying the application provided from a database via the intermediate web server.

4. The method of claim 1, wherein the cookie generated by the first traffic manager is encrypted.

5. A method as claimed in claim 1, wherein on receipt of the request from the first network traffic manager, the intermediate web server validates the portal session and keeps the portal session alive.

6. A non-transitory computer readable storage medium storing processor executable instructions for causing the method of claim 1 to be carried out when run on a general purpose computer.

7. A computer network for providing, as part of a web portal session, access for a user to a web application running on a server, the network comprising:
    first and second traffic managers connected via an intermediate web server; wherein:
        the first traffic manager comprises interface means for receiving from the user a request for access to the web application,
        the first traffic manager further comprises means for checking the request for a web portal session cookie and a cookie generated by the first traffic manager indicating authorization of the user to access the web application,
        the first traffic manager further comprises interface means for passing, when the cookies are found in the request, the request to the intermediate web server for forwarding to the second traffic manager, and
        the second traffic manager comprises interface means for receiving the request from the first traffic manager via the intermediate web server and for passing the received request to the web application,
    wherein the application responds to the request forwarded by the second traffic manager with a response including one or more cookies generated by the application, and
    wherein the one or more cookies generated by the application are name-spaced and each name space corresponds to a different virtual server running on the first traffic manager.

8. The computer network of claim 7, further comprising an authorization manager for receiving the request from the intermediate web server, and returning a response to the intermediate web server for forwarding to the first traffic manager; in which the response comprises an indication of the authorization status of the user for access to the web application.

9. The computer network of claim 8, wherein the response comprises additional parameters required by the requested web application.

10. The computer network of claim 8, wherein the response comprises a mapping between address information relating to the web application and address information relating to a server on which the application is running.

11. The computer network of claim 7, wherein:
    the first traffic manager is arranged in use to check the request to determine whether it is a first receipt of a first request received during the current web portal session from the user for the web application;
    the first traffic manager is further arranged in use to pass the request, when the request is determined to be the first receipt of a first request, to the intermediate web server for validation of the request and authorization of the user for access to the web application, and is further arranged in use to receive a response from the intermediate web server indicating the status of the request and of the user;
    the first traffic manager is further arranged in use to generate, when the request is indicated in the response as being valid and the user is indicated in the response as authorized, one or more cookies indicating the valid and authorized status, to add the one or more cookies to the response and to forward the response to the user, wherein the forwarded response comprises an indication requiring the user to re-submit the first request with the one or more cookies generated by the first traffic manager; and whether the request is the first receipt of the first request is determined by checking for the presence in the request of the one or more cookies generated by the first traffic manager.

12. The computer network of claim 7, wherein:

the first traffic manager further comprises interface means for passing, when no cookie generated by the first traffic manager indicating authorization of the user to access the application is found in the request, the request to the intermediate web server for validating and authorizing the user for access to the application;

the first traffic manager further comprises means for, upon receiving a response from the intermediate web server indicating successful validation and authorization of the user, generating a cookie indicating authorization of the user to access the application and sending the cookie to the web browser in a response to the request; and the response requires the web browser to resubmit the request incorporating the cookie sent in the response.

13. A computer network for providing, as part of a web portal session, access for a user to a web application running on a server, the network comprising:

first and second traffic managers connected via an intermediate web server; wherein:

the first traffic manager comprises a first interface configured to receive from the user a request for access to the web application, the first traffic manager is configured to check the request for a web portal session cookie and a cookie generated by the first traffic manager indicating authorization of the user to access the web application, the first traffic manager is further configured to pass, when the cookies are found in the request, the request to the intermediate web server for forwarding to the second traffic manager, and the second traffic manager comprises a second interface configured to receive the request from the first traffic manager via the intermediate web server and to pass the received request to the web application, wherein the application responds to the request forwarded by the second traffic manager with a response including one or more cookies generated by the application, and wherein the one or more cookies generated by the application are name-spaced and each name space corresponds to a different virtual server running on the first traffic manager.

14. The computer network of claim 13, further comprising an authorization manager for receiving the request from the intermediate web server, and returning a response to the intermediate web server for forwarding to the first traffic manager; in which the response comprises an indication of the authorization status of the user for access to the web application.

15. The computer network of claim 14, wherein the response comprises additional parameters required by the requested web application.

16. The computer network of claim 14, wherein the response comprises a mapping between address information relating to the web application and address information relating to a server on which the application is running.

17. The computer network of claim 13, wherein:

the first traffic manager is arranged in use to check the request to determine whether it is a first receipt of a first request received during the current web portal session from the user for the web application;

the first traffic manager is further arranged in use to pass the request, when the request is determined to be the first receipt of a first request, to the intermediate web server for validation of the request and authorization of the user for access to the web application, and is further arranged in use to receive a response from the intermediate web server indicating the status of the request and of the user;

the first traffic manager is further arranged in use to generate, when the request is indicated in the response as being valid and the user is indicated in the response as authorized, one or more cookies indicating the valid and authorized status, to add the one or more cookies to the response and to forward the response to the user, wherein the forwarded response comprises an indication requiring the user to re-submit the first request with the one or more cookies generated by the first traffic manager; and whether the request is the first receipt of the first request is determined by checking for the presence in the request of the one or more cookies generated by the first traffic manager.

18. The computer network of claim 13, wherein:

the first traffic manager is further configured to pass, when no cookie generated by the first traffic manager indicating authorization of the user to access the application is found in the request, the request to the intermediate web server for validating and authorizing the user for access to the application;

the first traffic manager is further configured to, upon receiving a response from the intermediate web server indicating successful validation and authorization of the user, generate a cookie indicating authorization of the user to access the application and send the cookie to the web browser in a response to the request; and the response requires the web browser to resubmit the request incorporating the cookie sent in the response.

* * * * *